(12) United States Patent
Larson et al.

(10) Patent No.: US 6,389,492 B1
(45) Date of Patent: May 14, 2002

(54) APPARATUS FOR FLEXIBLY ALLOCATING REQUEST/GRANT PINS BETWEEN MULTIPLE BUS CONTROLLERS

(75) Inventors: Douglas A. Larson, Lakeville; Joseph Jeddeloh, NE. Blaine; Jeffrey J. Rooney, Blaine, all of MN (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/418,465

(22) Filed: Oct. 15, 1999

(51) Int. Cl.$^7$ .............................................. G06F 13/00
(52) U.S. Cl. ........................ 710/107; 710/240; 710/52
(58) Field of Search .................. 710/107–119, 240–244

(56) References Cited

U.S. PATENT DOCUMENTS

| | | | | |
|---|---|---|---|---|
| 4,604,689 A | * | 8/1986 | Burger | 710/101 |
| 5,151,994 A | * | 9/1992 | Wille et al. | 710/116 |
| 5,557,756 A | * | 9/1996 | Spencer | 710/119 |
| 5,596,729 A | * | 1/1997 | Lester et al. | 710/128 |
| 5,652,895 A | * | 7/1997 | Poisner | 713/322 |
| 6,070,205 A | * | 5/2000 | Kato et al. | 710/100 |

* cited by examiner

Primary Examiner—Rupal Dharia
(74) Attorney, Agent, or Firm—Park, Vaughan & Fleming LLP

(57) ABSTRACT

One embodiment of the present invention provides an apparatus that flexibly allocates I/O pins used for bus grant signals between bus controllers. The apparatus includes a semiconductor chip containing a first bus arbitration circuit and a second bus arbitration circuit. A first set of grant lines originates from the first bus arbitration circuit and is used to grant control of a first bus to devices on the first bus. This first set of grant lines is divided into a first subset of grant lines and a second subset of grant lines. A second set of grant lines originates from the second bus arbitration circuit and is used to grant control of a second bus to devices on the second bus. This second set of grant lines is divided into a third subset of grant lines and a fourth subset of grant lines. A selector circuit selects a plurality of outputs from between the first subset of grant lines and the third subset of grant lines. This plurality of outputs is coupled to a first set of output pins on the semiconductor chip. The selector circuit is configured to select the first subset of grant lines to be driven through the first set of output pins during a first mode of operation, and is configured to select the third subset of grant lines to driven through the first set of output pins during a second mode of operation.

21 Claims, 4 Drawing Sheets

APPARATUS FOR FLEXIBLY ALLOCATING REQUEST/GRANT PINS BETWEEN MULTIPLE BUS CONTROLLERS

RELATED APPLICATION

The subject matter of this application is related to the subject matter in a co-pending non-provisional application by the same inventor(s) as the instant application and filed on the same day as the instant application entitled, "Method for Flexibly Allocating Request/Grant Pins Between Multiple Bus Controllers," having Ser. No. 09/418,468, and filing date Oct. 15, 1999.

BACKGROUND

1. Field of the Invention

The present invention relates to buses in computer systems. More particularly, the present invention relates to a system for flexibly allocating I/O pins used for bus request and bus grant signals between multiple bus controllers located on the same semiconductor chip.

2. Related Art

Much of the interconnection circuitry in a microprocessor-based computer system is typically aggregated in a "core logic" unit that couples the microprocessor to other parts of the computer system, such as a memory, a peripheral bus and a graphics controller. For reasons of cost, it is preferable to integrate the core logic unit into a single semiconductor chip. However, the I/O pin limitations on a single chip can present problems. For example, a single core logic chip that includes all of a computer system's interconnection circuitry may require interfaces for a processor bus, a memory bus, an AGP bus for a graphics controller and a PCI bus for peripheral devices. Providing I/O pins for all of these interfaces requires many hundreds of I/O pins, especially if the buses support 64 bit transfers. Given present semiconductor packaging technology, this I/O pin requirement can easily exceed the I/O pin limitations of a single semiconductor chip.

Note that many bus signals lines are not utilized well. In particular, some bus grant lines and bus request lines are not always needed. Recall that bus request lines are used by devices on the bus to request control of the bus from a bus arbiter in order to perform bus accesses. Bus grant lines are used by the bus arbiter to grant control of the bus to a requester. In a typical bus, such as the peripheral component interconnect (PCI) bus, there is one request line and one grant line for each master device on the bus. For example, the PCI bus supports up to seven bus request lines and seven bus grant lines for up to seven bus masters.

In order to conserve on the number of I/O pins used, a typical core logic chip provides a limited number of pins for request lines and grant lines. This limits the number of bus master devices that can be supported. Furthermore, the number of request and grant lines are typically fixed for each bus controller. This means that a typical core logic chip cannot be used in certain computer system configurations. For example, a given computer system configuration may require a particular allocation of request and grant lines between bus interfaces, whereas another computer system configuration may require a different allocation.

What is needed is a system for flexibly allocating I/O pins used for bus request and bus grant signals between multiple bus controllers located on the same semiconductor chip.

SUMMARY

One embodiment of the present invention provides an apparatus that flexibly allocates I/O pins used for bus grant signals between bus controllers. The apparatus includes a semiconductor chip containing a first bus arbitration circuit and a second bus arbitration circuit. A first set of grant lines originates from the first bus arbitration circuit and is used to grant control of a first bus to devices on the first bus. This first set of grant lines is divided into a first subset of grant lines and a second subset of grant lines. A second set of grant lines originates from the second bus arbitration circuit and is used to grant control of a second bus to devices on the second bus. This second set of grant lines is divided into a third subset of grant lines and a fourth subset of grant lines. A selector circuit selects a plurality of outputs from between the first subset of grant lines and the third subset of grant lines. This plurality of outputs is coupled to a first set of output pins on the semiconductor chip. The selector circuit is configured to select the first subset of grant lines to be driven through the first set of output pins during a first mode of operation, and is configured to select the third subset of grant lines to driven through the first set of output pins during a second mode of operation.

In one embodiment of the present invention, the second subset of grant lines is coupled to a second set of output pins, and the fourth subset of grant lines is coupled to a third set of output pins.

One embodiment of the present invention includes a set of request lines coupled to input pins of the semiconductor chip. This set of request lines is divided into a first subset of request lines, a second subset of request lines and a third subset of request lines. The first subset of request lines is coupled to the first bus arbitration circuit. The second subset of request lines is coupled to the second bus arbitration circuit. The third subset of request lines is coupled to both the first bus arbitration circuit and the second bus arbitration circuit. In a variation on this embodiment, a routing circuit is configured to route the third subset of request lines to the first bus arbitration circuit during the first mode of operation, and is configured to route the third subset of request lines to the second bus arbitration circuit during the second mode of operation.

One embodiment of the present invention includes a configuration register that indicates whether the selector circuit is operating in the first mode of operation or in the second mode of operation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
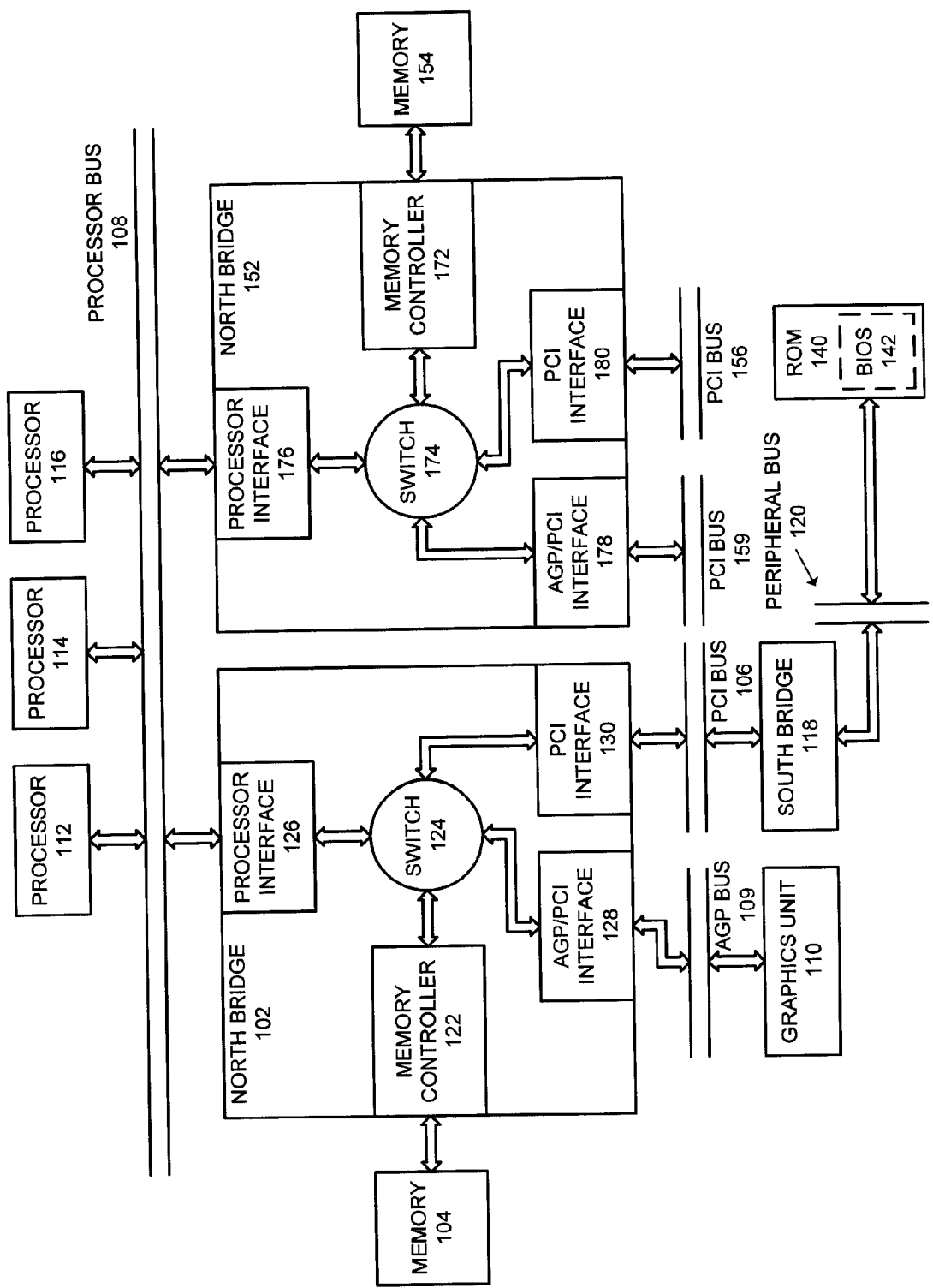
FIG. 1 illustrates a computer system in accordance with an embodiment of the present invention.

FIG. 1 illustrates a computer system in accordance with an embodiment of the present invention. The computer system illustrated in FIG. 1 includes processors 112, 114 and 116, which are coupled to processor bus 108. Processors 112, 114 and 116 can include any type of general or special purpose processors, including, but not limited to microprocessors, mainframe computers, digital signal processors, graphics processors and device controllers. Processor bus 108 can include any type of communication channel for coupling a processor to other devices in the computer system, including peripheral devices, memory devices and other processors.

North bridge 102 couples processor bus 108 to, memory 104, graphics unit 110 and PCI bus 106. As illustrated in FIG. 1, north bridge 102 contains: processor interface 126 for communicating with processor bus 108; accelerated graphics port (AGP)/PCI interface 128 for communicating with graphics unit 110 through AGP bus 109; memory controller 122 for communicating with memory 104; and PCI interface 130 for communicating with PCI bus 106. Interfaces 126, 128, 130 and memory controller 122 are coupled together through switch 124. Switch 124 can include any type of switching circuitry that is able to selectively couple together to interfaces 126, 128, 130 and memory controller 122.

Memory 104 can include any type of volatile or non-volatile random access memory.

Graphics unit 110 can include any special-purpose circuitry for performing graphics operations. This allows graphics computations to be off-loaded from processors 112, 114 and 116. AGP bus 109 can include any communication channel for communicating with graphics unit 110.

PCI bus 106 couples north bridge 102 to south bridge 118. PCI bus 106 can include any type of communication channel for coupling north bridge 102 to other devices in a computer system, including peripheral devices and memory devices.

South bridge 118 includes circuitry for coupling together components of the computer system. More, particularly, south bridge 118 couples PCI bus 106 to peripheral bus 120.

Peripheral bus 120 can include any type of communication channel for coupling south bridge 118 to other devices in a computer system, including peripheral devices and memory devices. In one embodiment of the present invention, peripheral bus 120 is an ISA bus. Peripheral bus 120 is coupled to ROM 140, which contains BIOS 142.

The computer system illustrated in FIG. 1 includes another north bridge 152. North bridge 152 couples processor bus 108 to memory 154, PCI bus 159 and PCI bus 156. As illustrated in FIG. 1, north bridge 152 contains processor interface 176 for communicating with processor bus 108, AGP/PCI interface 178 for communicating with PCI bus 159, memory controller 172 for communicating with memory 154 and PCI interface 180 for communicating with PCI bus 156. Interfaces 176, 178, 180 and memory controller 172 are coupled together through switch 174. Switch 174 can include any type of switching circuitry that is able to selectively couple together to interfaces 176, 178, 180 and memory controller 172.

There are differences between north bridge 102 and north bridge 152. Note that in north bridge 102 AGP/PCI interface 128 communicates with graphics unit 110 across AGP bus 109, whereas in north bridge 152 AGP/PCI interface 178 communicates with PCI bus 159. In order to support communications across AGP bus 109, AGP/PCI interface 128 requires only one pair of bus request and bus grant lines. In contrast, AGP/PCI interface 178 may require multiple pairs of request and grant lines to support multiple masters on PCI bus 159. Providing multiple pairs of request and grant lines for both AGP/PCI interface 178 and PCI interface 180 can consume a large number of I/O pins.

In the computer system illustrated in FIG. 1, it is desirable to have a single north bridge chip that can provide a single pair of request and grant pins in a first mode of operation for AGP/PCI interface 128 and multiple pairs of request and grant lines for AGP/PCI interface 178 in a second mode of operation.

AGP/PCI Bus Interface

Figure 2:
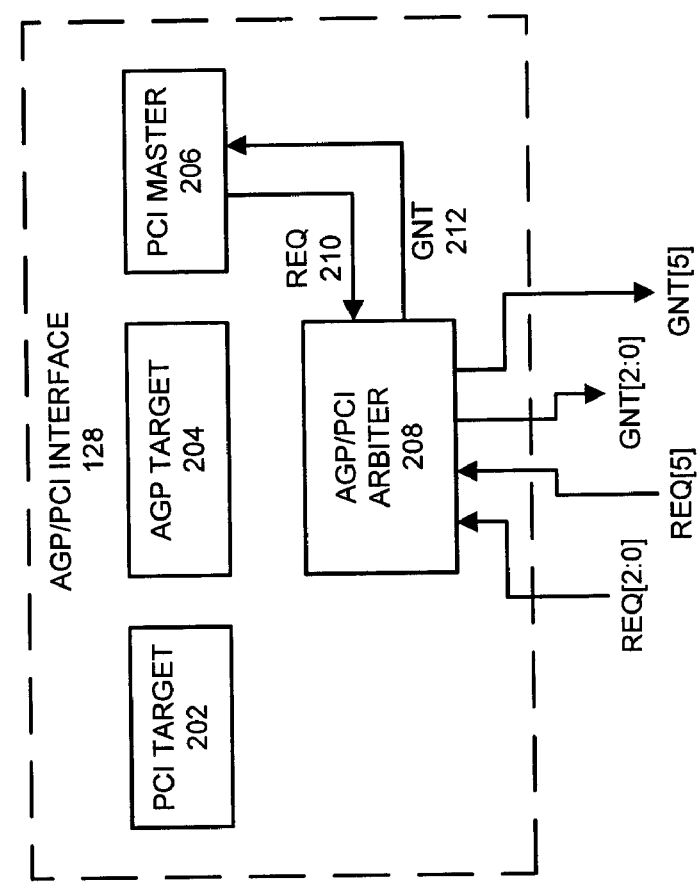
FIG. 2 illustrates an AGP/PCI bus interface in accordance with an embodiment of the present invention.

FIG. 2 illustrates the internal structure of AGP/PCI interface 128 and AGP/PCI interface 178 in accordance with an embodiment of the present invention. AGP/PCI interface 128 includes PCI target 202, AGP target 204, PCI master 206 and AGP/PCI arbiter 208. PCI target 202 provides an addressable target for a PCI master device on a PCI bus coupled to AGP/PCI interface 128. For example, in AGP/PCI interface 178, a master device on PCI bus 159 can read from or write to PCI target 202. AGP target 204 functions as an addressable target for a master on an AGP bus coupled to AGP/PCI interface 128. For example, in AGP/PCI interface 128, a master device on AGP bus 109 can read from or write to AGP target 204. PCI master 206 functions as a master device that can grab control of a PCI bus. For example, PCI master 306 within AGP/PCI interface 178 can grab control of PCI bus 159.

Finally, AGP/PCI arbiter 208 determines which AGP or PCI device has control over the AGP bus or the PCI bus attached to AGP/PCI interface 128. Note that AGP/PCI arbiter 208 can grant control to PCI master 206 within AGP/PCI interface 128 through request line 210 and grant line 212. Also note that AGP/PCI interface 128 receives request signals on request lines [5] and [2:0], and generates corresponding grant signals on grant lines [5] and [2:0].

PCI Bus Interface

Figure 3:
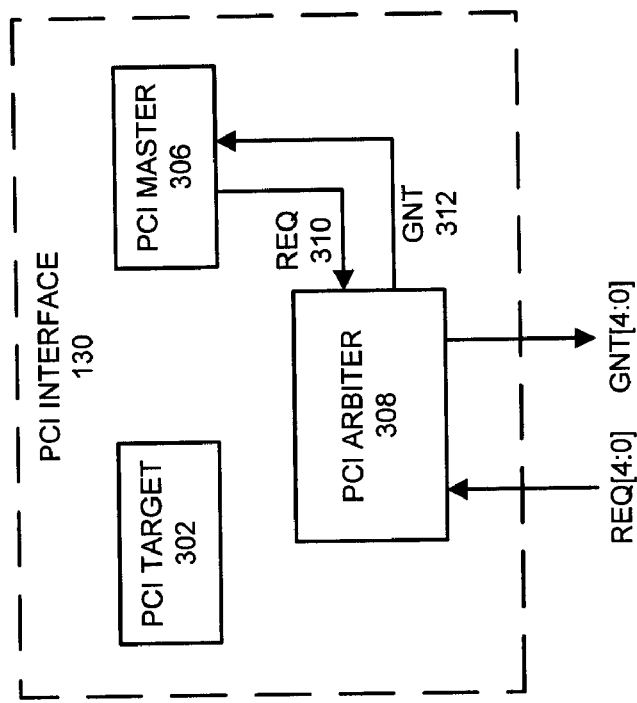
FIG. 3 illustrates a PCI interface in accordance with an embodiment of the present invention.

FIG. 3 illustrates the internal structure of PCI interface 130 and PCI interface 180 in accordance with an embodiment of the present invention. The internal structure of PCI interface 130 is similar to the internal structure of AGP/PCI interface 128 described above. Like AGP/PCI interface 128, PCI interface 130 includes PCI target 302, PCI master 306 and PCI arbiter 308. The major difference is that PCI interface 130 does not include an AGP target.

PCI arbiter 308 determines which PCI device has control over PCI bus 106 attached to PCI interface 130. Note that PCI arbiter 308 can grant control to PCI master 306 within PCI interface 130 through request line 310 and grant line 312. PCI interface 130 additionally receives request signals on request lines [4:0] and generates corresponding grant signals on grant lines [4:0].

Circuitry for Selectively Allocating I/O Pins to Request and Grant Signals

Figure 4:
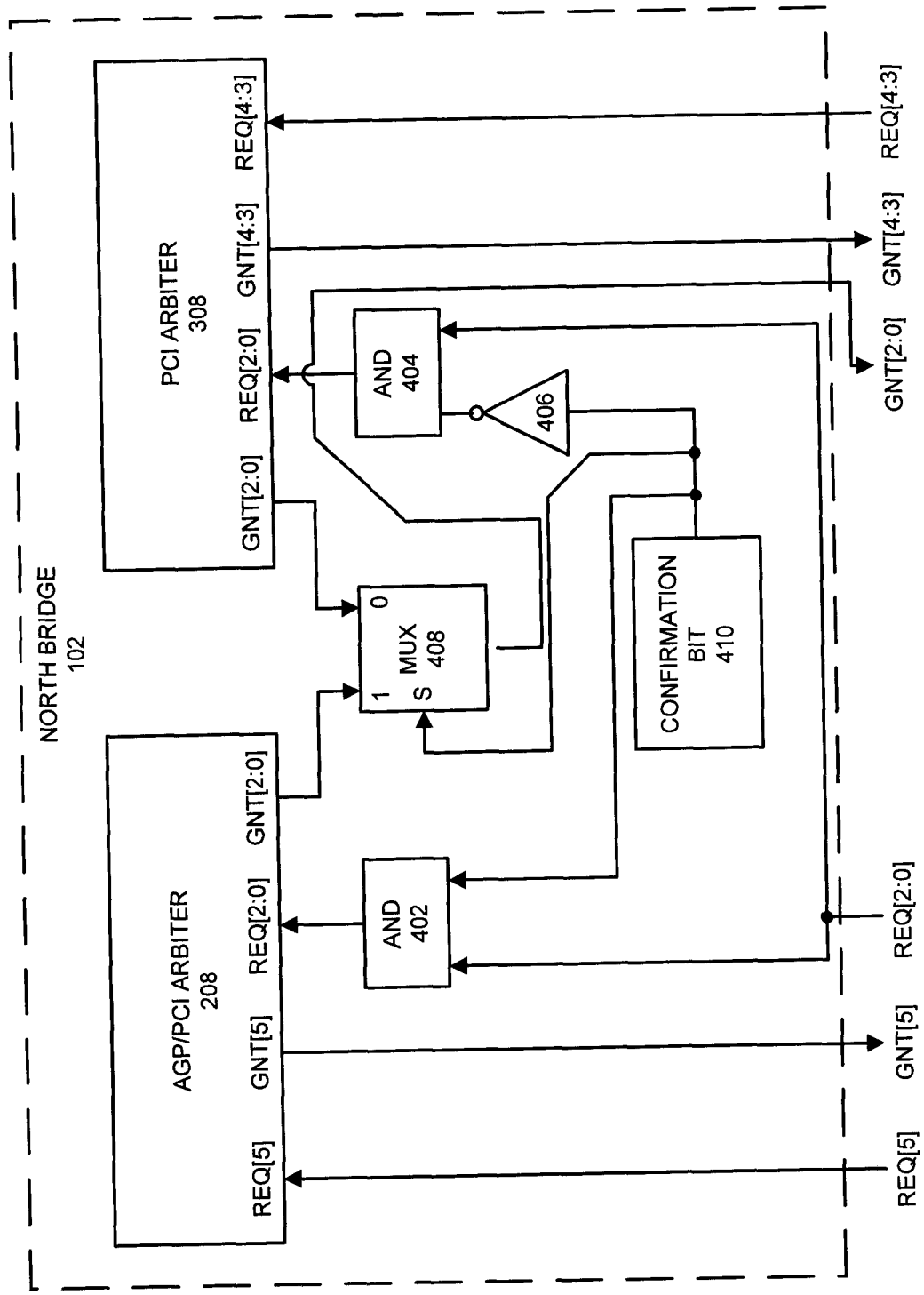
FIG. 4 illustrates circuitry for selectively allocating I/O pins used for request and grant signals between bus interfaces in accordance with an embodiment of the present invention.

FIG. 4 illustrates circuitry for selectively allocating I/O pins used for request and grant signals between bus interfaces in accordance with an embodiment of the present invention. The circuitry illustrated in FIG. 4 routes request and grant signals from the chip boundary of north bridge 102 into AGP/PCI arbiter 208 and PCI arbiter 308. As mentioned above, AGP/PCI arbiter 208 receives request signals [5] and [2:0] and generates grant signals [5] and [2:0], while PCI arbiter 308 receives request signals [4:0] and generates grant signals [5:0].

A number of signals pass straight through from I/O pins at the boundary of north bridge 102 to AGP/PCI arbiter 208 and PCI arbiter 308. Request signal [5] and grant signal [5] are coupled directly to AGP/PCI arbiter 208. Request signals [4:3] and grant signals [4:3] are coupled directly to PCI arbiter 308.

A number of signals can be selectively switched between AGP/PCI arbiter 208 and PCI arbiter 308. In a first mode of operation, request signals [2:0] and grant signals [2:0] are coupled to AGP/PCI arbiter 208. In a second mode of operation, request signals [2:0] and grant signals [2:0] are coupled to PCI arbiter 308.

This switching is accomplished using AND gates 402, AND gates 404 and multiplexer 408. During the first mode of operation, configuration bit 410 assumes a one value. This causes multiplexer 408 to select grant lines [2:0] from AGP/PCI arbiter 208. This also causes AND gates 402 to pass request lines [2:0] into AGP/PCI arbiter 208, and causes AND gates 404 block request lines [2:0] into PCI arbiter 308. During the second mode of operation, configuration bit 410 assumes a zero value. This causes multiplexer 408 to select grant lines [2:0] from PCI arbiter 308. This also causes AND gates 404 to pass request lines [2:0] into PCI arbiter 308, and causes AND gates 402 block request lines [2:0] into AGP/PCI arbiter 208.

In one embodiment of the present invention, configuration bit 410 is loaded through one of request lines [5:0] during a system initialization operation.

Note that during the first mode of operation, AGP/PCI arbiter 208 has four pairs of request and grant lines and PCI arbiter 308 has two pairs. In the second mode of operation, AGP/PCI arbiter 208 has a single pair of request and grant lines while PCI arbiter 308 has five pairs. This allows the same north bridge chip to be configured to control an AGP bus 109 and a PCI bus 106 in the second mode of operation, and to be configured to control two PCI buses 159 and 156 in the first mode of operation.

Process of Selectively Allocating I/O Pins to Request and Grant Signals

Figure 5:
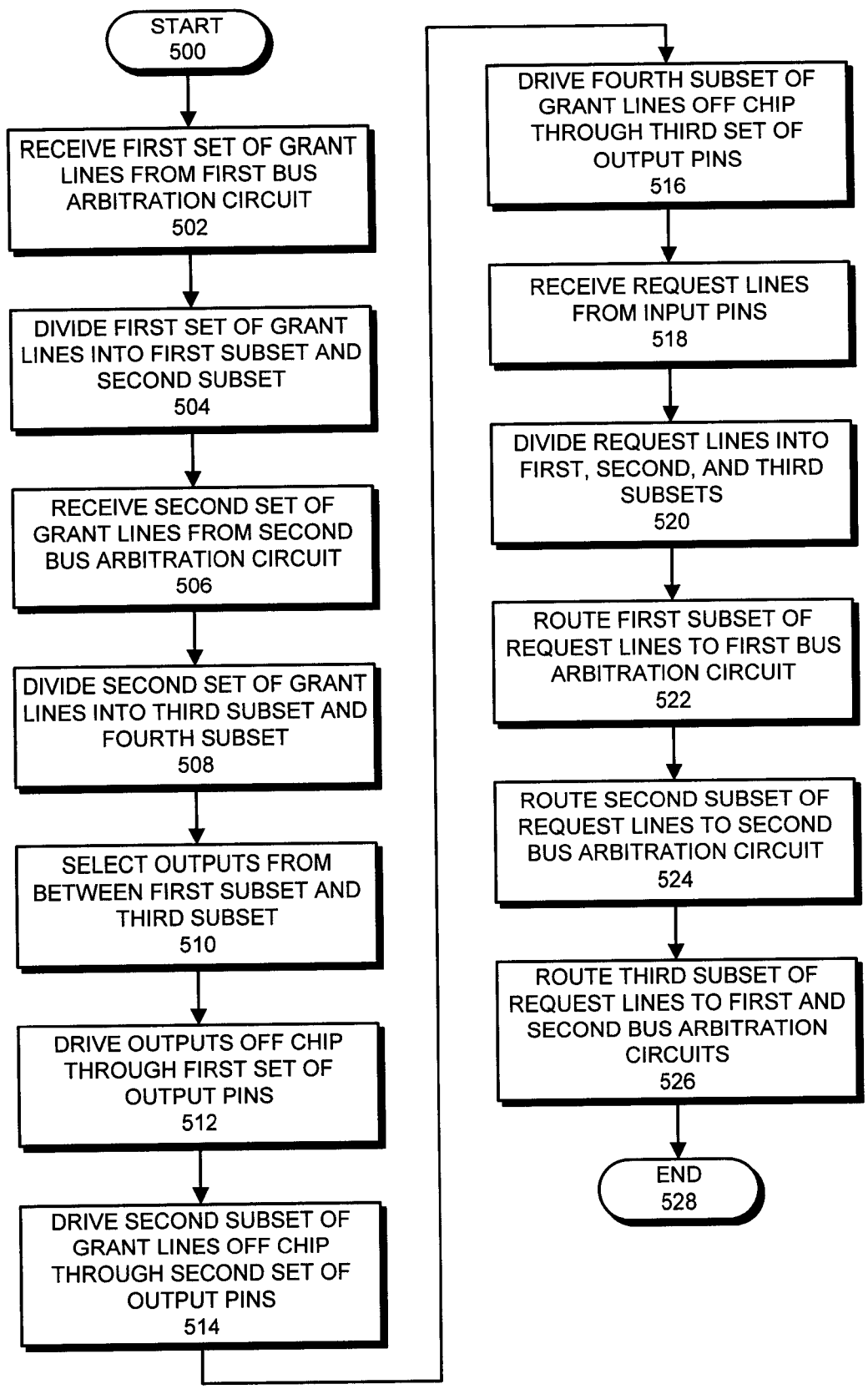
FIG. 5 is a flow chart illustrating the process of selectively allocating I/O pins to request and grant signals in accordance with an embodiment of the present invention.

FIG. 5 is a flow chart illustrating the process of selectively allocating I/O pins to request and grant signals in accordance with an embodiment of the present invention. The system starts by receiving a first set of grant lines from a first bus arbitration circuit (step 502). In FIG. 4, this corresponds to receiving grant lines [5] and [2:0] from AGP/PCI arbiter 208. The system divides the first set of grant lines into a first subset of grant lines and a second subset of grant lines (step 504). In FIG. 4, this corresponds to dividing the grant lines from AGP/PCI arbiter 208 into grant lines [2:0] (first subset) and grant line [5] (second subset).

The system also receives a second set of grant lines from a second bus arbitration circuit (step 506). In FIG. 4, this corresponds to receiving grant lines [4:0] from PCI arbiter 308. The system divides the second set of grant lines into a third subset of grant lines. and a fourth subset of grant lines (step 508). In FIG. 4, this corresponds to dividing grant lines [4:0] from PCI arbiter 308 into grant lines [2:0] (third subset) and grant lines [4:3] (fourth subset).

Next, the system selects outputs from between the first subset and the third subset (step 510). In FIG. 4, this corresponds to using multiplexer 408 to select between grant lines [2:0] from AGP/PCI arbiter 208 and grant lines [2:0] from PCI arbiter 308. These outputs are driven off-chip through a first set of output pins (step 512).

Also note that the second subset of grant lines is driven off chip through a second set of output pins (step 514), and the fourth subset of grant lines is driven off chip through a third set of output pins (step 516). In FIG. 4, this corresponds to grant line [5] proceeding directly off chip through from AGP/PCI arbiter 208, and grant lines [4:3] proceeding directly off chip from PCI arbiter 308.

The system also receives request lines from input pins of the chip (step 518). These request lines are divided into a first subset, a second subset and a third subset (step 520). In FIG. 4, this corresponds to request lines [5:0] entering north bridge 102 and being divided into request line [5] (first subset), request lines [4:3] (second subset) and request lines [2:0] (third subset).

The first subset of request lines is routed to the first bus arbitration circuit (step 522). In FIG. 4, this corresponds to request line [5] being routed directly to AGP/PCI arbiter 208.

The second subset of request lines is routed to the second bus arbitration circuit (step 524). In FIG. 4, this corresponds to request lines [4:3] being routed directly to PCI arbiter 308.

The third subset of request lines is routed to both the first bus arbitration circuit and the second bus arbitration circuit (step 526). In FIG. 4, this corresponds to request lines [2:0] being routed to both AGP/PCI arbiter 208 and PCI arbiter 308 through AND gates 402 and 404.

Note that although the present invention has been described in the context of an implementation involving PCI and AGP interfaces within a north bridge 102, the present invention can apply to any method or device involving two bus controllers located on the same semiconductor chip that share I/O pins used for bus arbitration purposes.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. An apparatus that flexibly allocates I/O pins used for bus grant signals between bus controllers, comprising:

a semiconductor chip;

a first bus arbitration circuit located on the semiconductor chip;

a second bus arbitration circuit located on the semiconductor chip;

a first set of grant lines emanating from the first bus arbitration circuit, the first set of grant lines being used to grant control of a first bus to devices on the first bus, the first set of grant lines being divided into a first subset of grant lines and a second subset of grant lines;

a second set of grant lines emanating from the second bus arbitration circuit, the second set of grant lines being used to grant control of a second bus to devices on the second bus, the second set of grant lines being divided into a third subset of grant lines and a fourth subset of grant lines; and a selector circuit that selects a plurality of outputs from between the first subset of grant lines and the third subset of grant lines, the plurality of outputs being coupled to a first set of output pins on the semiconductor chip;

wherein the selector circuit is configured to select the first subset of grant lines to be driven through the first set of output pins during a first mode of operation, and is configured to select the third subset of grant lines to driven through the first set of output pins during a second mode of operation.

2. The apparatus of claim 1, wherein the second subset of grant lines is coupled to a second set of output pins, and the fourth subset of grant lines is coupled to a third set of output pins.

3. The apparatus of claim 1, further comprising a set of request lines coupled to input pins of the semiconductor chip, the set of request lines being divided into a first subset of request lines, a second subset of request lines and a third subset of request lines, wherein:
the first subset of request lines is coupled to the first bus arbitration circuit;
the second subset of request lines is coupled to the second bus arbitration circuit; and
the third subset of request lines is coupled to the first bus arbitration circuit and the second bus arbitration circuit.

4. The apparatus of claim 3, further comprising a routing circuit that is configured to route the third subset of request lines to the first bus arbitration circuit during the first mode of operation, and is configured to route the third subset of request lines to the second bus arbitration circuit during the second mode of operation.

5. The apparatus of claim 1, wherein the selector circuit includes a multiplexer.

6. The apparatus of claim 1, wherein the first bus arbitration circuit includes a bus arbitration circuit for a peripheral component interconnect (PCI) bus.

7. The apparatus of claim 6, wherein the second bus arbitration circuit can be configured to operate for a PCI bus or an accelerated graphics port (AGP) bus.

8. The apparatus of claim 1, further comprising a configuration register that indicates whether the selector circuit is operating in the first mode of operation or in the second mode of operation.

9. The apparatus of claim 1, wherein the semiconductor chip is a first north bridge chip.

10. The apparatus of claim 9, further comprising:
a second north bridge chip; and
a computer system containing the first north bridge chip and the second north bridge chip.

11. The apparatus of claim 10, wherein:
the first north bridge chip is configured to provide arbitration for an AGP bus and arbitration for a first PCI bus; and wherein
the second north bridge chip is configured to provide arbitration for a second PCI bus and arbitration for a third PCI bus.

12. An apparatus that flexibly allocates I/O pins used for bus grant signals between bus controllers, comprising:
a semiconductor chip;
a first bus arbitration circuit located on the semiconductor chip;
a second bus arbitration circuit located on the semiconductor chip;
a first set of grant lines emanating from the first bus arbitration circuit, the first set of grant lines being used to grant control of a first bus to devices on the first bus, the first set of grant lines being divided into a first subset of grant lines and a second subset of grant lines;
a second set of grant lines emanating from the second bus arbitration circuit, the second set of grant lines being used to grant control of a second bus to devices on the second bus, the second set of grant lines being divided into a third subset of grant lines and a fourth subset of grant lines;

a selector circuit that selects a plurality of outputs from between the first subset of grant lines and the third subset of grant lines, the plurality of outputs being coupled to a first set of output pins on the semiconductor chip;
wherein the selector circuit is configured to select the first subset of grant lines to be driven through the first set of output pins during a first mode of operation, and is configured to select the third subset of grant lines to driven through the first set of output pins during a second mode of operation;
wherein the second subset of grant lines is coupled to a second set of output pins, and the fourth subset of grant lines is coupled to a third set of output pins; and
a set of request lines coupled to input pins of the semiconductor chip, the set of request lines being divided into a first subset of request lines, a second subset of request lines and a third subset of request lines;
wherein the first subset of request lines is coupled to the first bus arbitration circuit, the second subset of request lines is coupled to the second bus arbitration circuit, and the third subset of request lines is coupled to the first bus arbitration circuit and the second bus arbitration circuit.

13. The apparatus of claim 12, further comprising a routing circuit that is configured to route the third subset of request lines to the first bus arbitration circuit during the first mode of operation, and is configured to route the third subset of request lines to the second bus arbitration circuit during the second mode of operation.

14. The apparatus of claim 12, wherein the selector circuit includes a multiplexer.

15. The apparatus of claim 12, wherein the first bus arbitration circuit includes a bus arbitration circuit for a peripheral component interconnect (PCI) bus.

16. The apparatus of claim 15, wherein the second bus arbitration circuit can be configured to operate for a PCI bus or an accelerated graphics port (AGP) bus.

17. The apparatus of claim 12, further comprising a configuration register that indicates whether the selector circuit is operating in the first mode of operation or in the second mode of operation.

18. The apparatus of claim 12, wherein the semiconductor chip is a first north bridge chip.

19. The apparatus of claim 18, further comprising:
a second north bridge chip; and
a computer system containing the first north bridge chip and the second north bridge chip.

20. The apparatus of claim 19, wherein:
the first north bridge chip is configured to provide arbitration for an AGP bus and arbitration for a first PCI bus; and wherein
the second north bridge chip is configured to provide arbitration for a second PCI bus and arbitration for a third PCI bus.

21. A computer system that flexibly allocates I/O pins used for bus grant signals between bus controllers, comprising:
a processor;
a memory;
a core logic chip;
a first bus arbitration circuit located on the core logic chip;
a second bus arbitration circuit located on the core logic chip;
a first set of grant lines emanating from the first bus arbitration circuit, the first set of grant lines being used to grant control of a first bus to devices on the first bus, the first set of grant lines being divided into a first subset of grant lines and a second subset of grant lines;

a second set of grant lines emanating from the second bus arbitration circuit, the second set of grant lines being used to grant control of a second bus to devices on the second bus, the second set of grant lines being divided into a third subset of grant lines and a fourth subset of grant lines; and a selector circuit that selects a plurality of outputs from between the first subset of grant lines and the third subset of grant lines, the plurality of outputs being coupled to a first set of output pins on the core logic chip;

wherein the selector circuit is configured to select the first subset of grant lines to be driven through the first set of output pins during a first mode of operation, and is configured to select the third subset of grant lines to driven through the first set of output pins during a second mode of operation.

* * * * *